United States Patent [19]
Sato

[11] Patent Number: 5,820,536
[45] Date of Patent: Oct. 13, 1998

[54] AUTOMATIC TOOL EXCHANGING APPARATUS FOR MACHINE TOOL

[75] Inventor: Mikohiko Sato, Niwa-gun, Japan

[73] Assignee: Okuma Corporation, Aichi, Japan

[21] Appl. No.: 560,360

[22] Filed: Nov. 17, 1995

[30] Foreign Application Priority Data

Nov. 18, 1994 [JP] Japan ..................... 6-309926

[51] Int. Cl.⁶ .................................. B23Q 3/157
[52] U.S. Cl. .................. 483/38; 483/30; 483/36; 483/51
[58] Field of Search ................ 483/30, 36, 38, 483/39, 51

[56] References Cited

U.S. PATENT DOCUMENTS

| | | | |
|---|---|---|---|
| 3,412,459 | 11/1968 | Hollis | 483/9 |
| 4,833,772 | 5/1989 | Kobayashi et al. | 29/568 |

FOREIGN PATENT DOCUMENTS

| | | | |
|---|---|---|---|
| 1477347 | 9/1969 | Germany . | |
| 63-34043 | 2/1988 | Japan | 483/39 |
| 1-97536 | 4/1989 | Japan | 483/39 |
| 2198375 | 6/1988 | United Kingdom . | |

OTHER PUBLICATIONS

European Search Report dated Mar. 22, 1996.

*Primary Examiner*—Daniel W. Howell
*Assistant Examiner*—Christopher Kirkman
*Attorney, Agent, or Firm*—Fish & Richardson P.C.

[57] ABSTRACT

An automatic tool exchanging apparatus carries tools between a magazine pot allocated to an exchanging position and a leading end of a spindle of a machine tool spinning a tool about a vertical axis through the turning and displacement movements of an exchanging arm. A single drive motor is used to drive the tool exchanging arm for rotation and displacement and a tool magazine for rotation. The drive system is thus simplified, thereby reducing the substantial production cost and the space to be occupied.

7 Claims, 4 Drawing Sheets

AUTOMATIC TOOL EXCHANGING APPARATUS FOR MACHINE TOOL

BACKGROUND OF THE INVENTION

The present invention relates to an automatic tool exchanging apparatus for a machine tool, which turns and displaces an exchanging arm for carrying a tool between a magazine pot allocated to an exchanging position by a tool magazine and a leading end of a spindle of the machine tool spinning a tool around a rotation axis.

A conventional automatic tool exchanging apparatus has separate drive systems for a tool magazine and an exchanging arm. For instance, an apparatus driving an exchanging arm with a cam mechanism requires two drive motors such as ones for driving the exchanging arm and for driving a tool magazine. Alternatively, an apparatus in which an exchanging arm is driven through an NC (numerical control) requires three drive motors such as one for turning the exchanging arm, and one for inserting and removing a tool, as well as one for turning a tool magazine.

In these types of automatic tool exchanging apparatuses, as the number of drive motor is increased, the drive system gets complicated and the production cost rises.

SUMMARY OF THE INVENTION

An object of the present invention is therefore to provide an inexpensive automatic tool exchanging apparatus for a machine tool with a simplified drive system.

According to the present invention, there is provided an automatic tool exchanging apparatus for a machine tool, the apparatus comprises: a tool magazine including a plurality of magazine pots arranged on a circle for accommodating tools, the tool magazine turning about an axis of the circle so as to allocate a designated magazine pot to an exchanging position; and an exchanging arm including a support turnable about a first rotation axis and displaceable along the first rotation axis, and a holder extending from the support for grasping a tool at its leading end; wherein the exchanging arm is turned and displaced for carrying a tool between the magazine pot allocated to the exchanging position and a leading end of a spindle of the machine tool spinning a tool about a second rotation axis, and the apparatus further comprising a single drive motor driving the exchanging arm for turning and displacement and the tool magazine for turning.

With the above arrangement, the single drive motor is used to drive both the exchanging arm for turning and displacement movements and the tool magazine for a turning movement. The drive system can be simplified, thereby providing an inexpensive automatic tool exchanging apparatus for a machine tool.

If the tool magazine turns about a third rotation axis parallel to a plane orthogonal to the second rotation axis, the magazine pot allocated takes an attitude at the exchanging position in parallel with the spindle of the machine tool, so that a drive mechanism can be simplified for driving the exchanging arm so as to carry a tool between the leading end of the spindle and the magazine pot.

Further, if the driving power is transmitted from the drive motor to the tool magazine via a first drive gear capable of rotating about a rotation axis parallel to the third rotation axis, the torque of the drive motor can easily be transmitted to the tool magazine.

Furthermore, if the driving power is transmitted from the drive motor to the tool magazine via a second drive gear capable of rotating about a rotation axis parallel to the third rotation axis and a cam mechanism receiving a torque from the second drive gear for converting the torque into turning and displacement movements of the exchanging arm, the torque of the drive motor can easily be transmitted to the tool magazine.

Furthermore, if the automatic tool exchanging apparatus further comprises a drive member rotated about a rotation axis parallel to the third rotation axis by the drive motor, and a shift gear mounted on the drive member for displacing along the drive member between a first position where the shift gear is engaged with the first drive gear and a second position where the shift gear is engaged with the second drive gear, the displacement of the shift gear enables a simple structure for transmitting a driving power from the single drive motor to both the tool magazine and the exchanging arm.

Furthermore, if the shift gear is provided with a lock member selectively fitted in the second drive gear at the first position so as to prevent the second drive gear from turning and in the first drive gear at the second position so as to prevent the first drive gear from turning, the exchanging arm cannot be operated during the operation of the tool magazine. Reversely, the tool magazine cannot be operated either during the operation of the exchanging arm.

BRIEF DESCRIPTION OF THE DRAWINGS

The other and further objects, features and advantages will become apparent from the following description of the preferred embodiment taken in conjunction with the accompanying drawings, wherein.

DESCRIPTION OF THE PREFERRED EMBODIMENT

The present invention will now be described by a way of a preferred embodiment in connection with the accompanying drawings.

Figure 1:
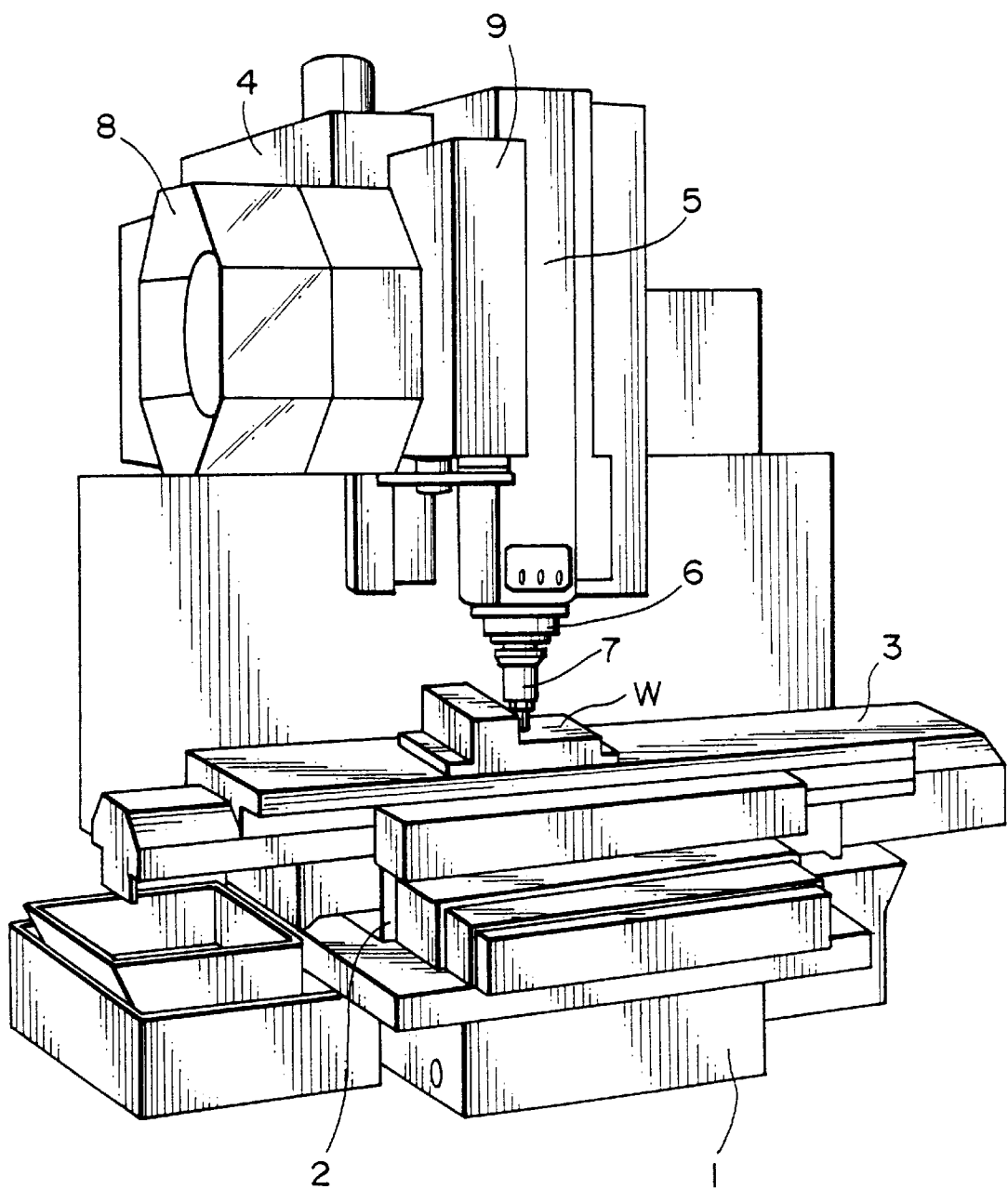
FIG. 1 illustrates a machining center to which an automatic tool exchanging apparatus for a machine tool, according to an embodiment of the invention, is applied.

FIG. 1 illustrates the entire structure of a vertical machining center to which an automatic tool exchanging apparatus of the present invention is applied. A saddle 2 is mounted on a bed 1 on a floor in the vertical machining center. The saddle 2 is guided and positioned in a first horizontal direction, for example, back and forth direction. A table 3 is mounted on the saddle 2. The table 3 is guided and positioned in a second horizontal direction orthogonal to the first horizontal direction, for example, left and right direction. A column 4 is disposed on the floor next to the bed 1.

The column 4 guides a spindle head 5 which is positioned along a vertical direction. The spindle head 5 supports a spindle 6 by means of a plurality of bearings, not shown, for rotation about a vertical axis. A tool holder 7 is detachably fitted in a tapered opening, not shown, for fixing a tool at the leading end of the spindle 6. The rotation of the spindle 6 thus causes a tool fitted at the leading end of the spindle 6 to spin about a vertical axis.

The column 4 is provided with a tool magazine 8, adjacent the spindle head 5, for locating a plurality of magazine pots accommodating tools in a circle. The tool magazine 8 turns about a central axis of the circle so as to allocate a designated magazine pot, selected from the plurality of magazine pots, to an exchanging position at the lowest position. An exchanging arm unit 9 is disposed between the tool magazine 8 and the spindle head 5. The exchanging arm unit 9 carries the tool holder 7 holding a tool between the tool magazine 8 and the tapered opening of the spindle 6.

Figure 2:
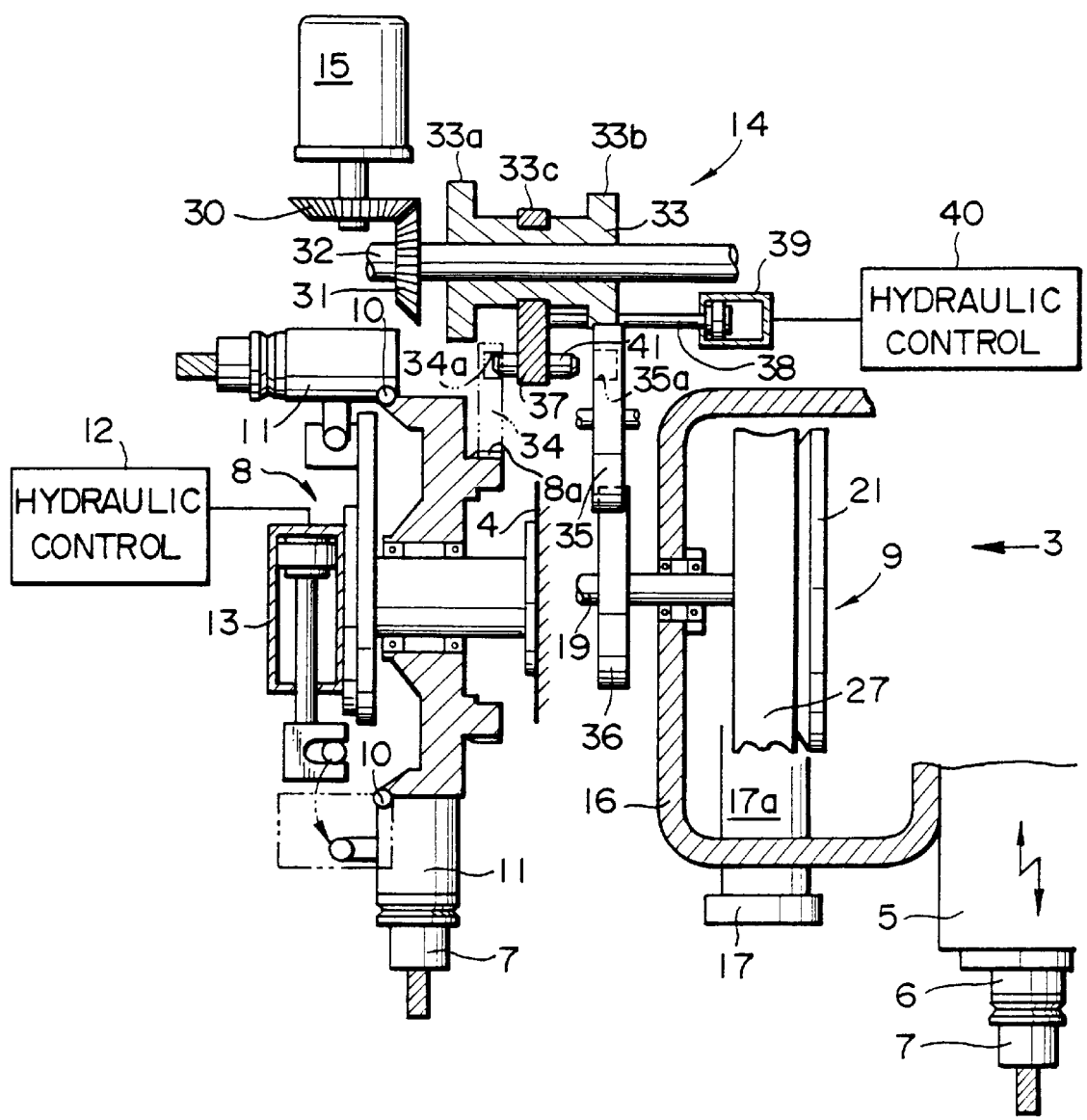
FIG. 2 is a partial sectional view of a tool magazine and its drive system.

The tool magazine 8 is, as shown in FIG. 2, supported by the column 4 for rotation about a horizontal axis. The tool magazine 8 is formed in a disk-like shape including magazine pots 11 each supported at a periphery of the tool magazine 8 by a pivotal shaft 10. The magazine pot 11 is generally held to take an attitude in a horizontal axis. Once the magazine pot 11 is allocated to the exchanging position in response to instructions of NC, a hydraulic controller (alternatively, pneumatic controller) 12 operates so as to allow a hydraulic cylinder 13 to turn the magazine pot 11 about the pivotal shaft 10. The magazine pot 11 turns by 90 degrees so as to take an attitude parallel to the spindle 6. The tool magazine 8 is driven by a single drive motor 15 via a drive system 14.

Figure 3:
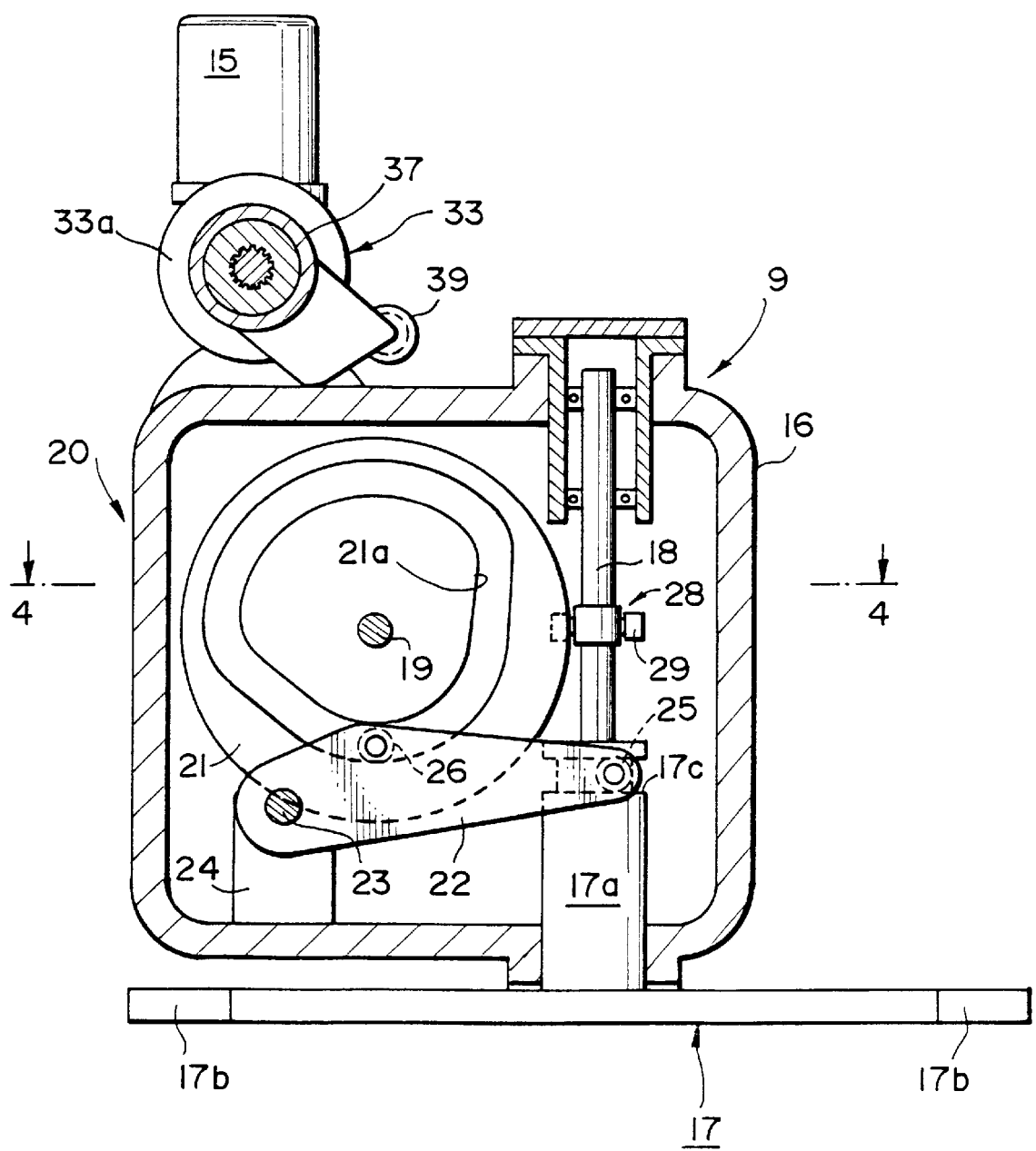
FIG. 3 is a partial sectional view of an exchanging arm taken along the arrow 3 in FIG. 2.

The exchanging arm unit 9 includes, referring to FIG. 3, a housing 16 attached to the column 4 and an exchanging arm 17 supported on the housing 16 for carrying the tool holder 7. A rotary shaft 18 is supported via bearings in the housing 16 for rotation about a vertical axis. The exchanging arm 17 is fixed to the lower end of the rotary shaft 18 through a spline. The exchanging arm 17 has a support 17a fitted over the rotary shaft 18 and a pair of holders 17b extending from the support 17a in a horizontal direction for grasping the tool holder 7 at the leading end thereof. The exchanging arm 17 is thus capable of turning about a vertical axis in response to the rotation of the rotary shaft 18 as well as of displacing in a vertical direction along the spline of the rotary shaft 18.

The exchanging arm 17 is driven by a cam mechanism 20 which convert a rotational movement of a cam drive shaft 19, extending in a horizontal direction, into rotation and vertical movements of the exchanging arm 17. The cam mechanism 20 includes a first cam plate 21 fixed to the cam drive shaft 19 for mutual rotation, and a swing lever 22 cooperating with the first cam plate 21. A base end of the swing lever 22 is pivotally supported by a pin 23 on a bracket 24 protruded from the housing 16. The swing lever 22 rotatably supports at its leading end a first roller follower 25 which is engaged in an annular groove 17c on the outer surface of a sleeve serving as the support 17a of the exchanging arm 17. A second roller follower 26 is rotatably supported at an intermediate location between the leading and base ends of the swing lever 22. The second roller follower 26 is engaged with a cam groove 21a formed on one surface of the first cam plate 21. When the first cam plate 21 rotates concurrently with the cam drive shaft 19, the cam groove 21a causes the second roller follower 26 to displace in a vertical direction, since the cam groove 21a changes its location in the radial direction. The swing lever 22 thus pivots about the pin 23, thereby causing the exchanging arm 17 to displace in a vertical direction along the spline of the rotary shaft 18 in the action of the first roller follower 25 at the leading end of the swing lever 22.

Figure 4:
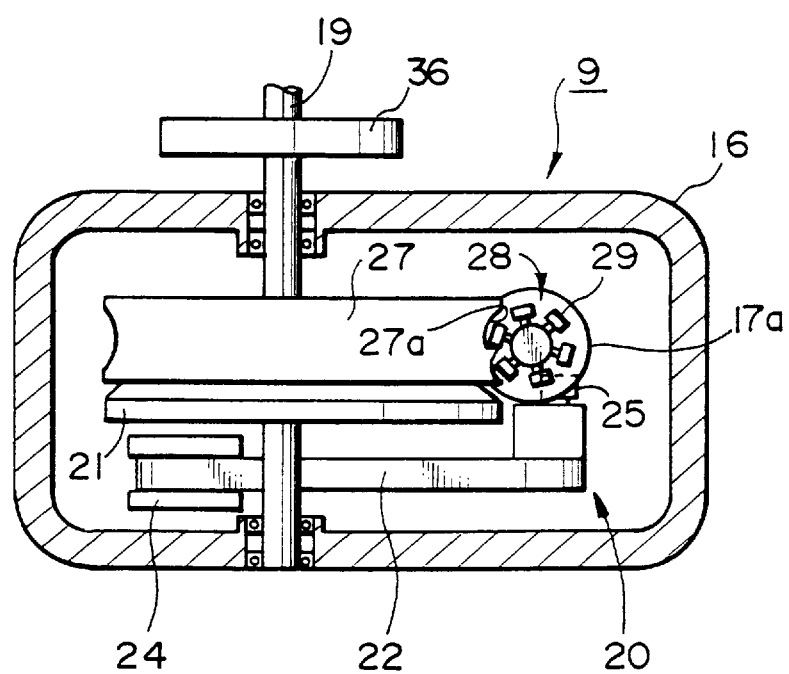
FIG. 4 is a sectional view taken along line 4—4 in FIG. 3.

The cam mechanism 20 is further provided with, referring also to FIG. 4, a second cam plate 27 fixed to the cam drive shaft 19 adjacent the first cam plate 21. A cam groove 27a is formed on a peripheral end surface of the second cam plate 27. A roller follower assembly 28 is mounted on the rotary shaft 18 to be engaged in the cam groove 27a. The roller follower assembly 28 has a plurality of rollers 29 each of which rotation axis radially extends from the axis of the rotary shaft 18. When the second cam plate 27 rotates concurrently with the cam drive shaft 19, the displacement of the rollers 29 guided by the cam groove 27a causes the exchanging arm 17 to intermittently rotate about the rotary shaft 18 by 90 and 180 degrees.

The rotation of the cam drive shaft 19 is caused by the drive motor 15 through the drive system 14. The single drive motor 15 employed in this manner without any separate drive motors enables to commonly execute the allocating operation of tool magazine 8 and the tool exchanging operation of the exchanging arm 17. Therefore, the structure of the automatic tool exchanging apparatus can be simplified, so that the production cost can be reduced. The description will now be made below of the drive system 14.

The drive system 14, as is apparent from FIG. 2, comprises a drive shaft 32 as a drive member rotatable about a horizontal axis by a rotating force transmitted from the drive motor 15 through a pair of bevel gears 30 and 31. A shift gear 33 is mounted on the drive shaft 32 for sliding along a spline of the drive shaft 32 between first and second positions. A first gear section 33a is formed on the shift gear 33 at one end thereof in the axial direction, and is engaged with a first drive gear 34 at the first position of the shift gear 33. The first drive gear 34 is capable of rotating about a horizontal axis and is engaged with the gear section 8a formed on the periphery of the tool magazine 8. Accordingly, the rotation of the shift gear 33 is transmitted to the tool magazine 8 via the first drive gear 34.

A second gear section 33b is formed on the shift gear 33 at the other end in the axial direction, and is engaged with a second drive gear 35 at the second position of the shift gear 33. The second drive gear 35 is engaged with a follower gear 36 fixed to the cam drive shaft 19 of the exchanging arm unit 9. The rotation of the shift gear 33 is thus transmitted to the cam drive shaft 19 via the second drive gear 35.

A shifter member 37 is mounted on the shift gear 33 for a relative rotation at an annular peripheral groove 33c formed on the outer surface of the shift gear 33. The shifter member 37 is driven in the action of a drive shaft 38 formed integral with the shifter member 37 and a hydraulic cylinder 39 connected to the drive shaft 38. The hydraulic cylinder 39 is controlled by a hydraulic controller 40. The introduction of hydraulic pressure into the hydraulic cylinder 39 causes the drive shaft 38 to advance so as to bring the shift gear 33 to the second position. The decrease of the hydraulic pressure in the hydraulic cylinder 39 causes the drive shaft 38 to retreat so as to bring the shift gear 33 to the first position. The shifter member 37, which is movable along with the shift gear 33, is provided with a lock member 41 shiftable between a first position where the lock member 41 is inserted into an engaging recess 35a of the second drive gear 35 so as to prevent the second drive gear 35 from rotating and a second position where the lock member 41 is inserted into an engaging recess 34a of the first drive gear 34 so as to prevent the first drive gear 34 from rotating.

The operation of this embodiment will be described. It is supposed that a workpiece W is being machined by a tool held by the tool holder 7 at the tip of the spindle 6. The hydraulic controller 40 controls the hydraulic pressure to be reduced in the hydraulic cylinder 39. The shift gear 33 moves to the first position to allow the engagement between the first gear section 33a and the first drive gear 34. When the drive motor 15 operates under this condition, torque is transmitted through the pair of bevel gears 30 and 31 to the drive shaft 32, then through the first gear section 33a of the shift gear 33 and the first drive gear 34, finally to the gear section 8a of the tool magazine 8. The tool magazine 8 is rotated to allocate a tool holder 7 to be next used to the exchanging position. Subsequently, the hydraulic controller 12 operates to increase the hydraulic pressure in the hydraulic cylinder 13, thereby tilting the magazine pot 11 in the radial direction. The tool holder 7 is set in this manner at the exchanging position.

Upon completing the machining of the workpiece W, the spindle head 5 is vertically moved and positioned at a certain exchanging position. In response to the output of the exchanging instructions from the NC, the hydraulic controller 40 operates to apply a hydraulic pressure to the hydraulic cylinder 39. The drive shaft 38 advances to position the shift gear 33 to the second position. At the second position, the second gear section 33b of the shift gear 33 is engaged with the second drive gear 35, and at the same time, the lock member 41 is inserted into the engaging recess 34a of the first drive gear 34. The lock member 41 is thus withdrawn from the engaging recess 35a of the second drive gear 35, allowing the rotation of the second gear 33b to be transmitted to the second drive gear 35.

Meanwhile, the first gear section 33a is disengaged from the first drive gear 34, so that the rotation of the shift gear 33 is not transmitted to the first drive gear 34. Besides, the lock member 41 works to reliably prevent the first drive gear 34 from rotating. When the drive motor 15 operates thereafter, the torque is transmitted through the pair of bevel gears 30 and 31, to the second gear section 33b of the shift gear 33 and the second drive gear 35, and finally to the follower gear 36. Consequently, the cam drive shaft 19 rotates to drive the first and second cam plates 21 and 27. The rotation of the second cam plate 27 causes the roller follower assembly 28 to rotate about the rotary shaft 18 while guided by the cam groove 27a. The exchanging arm 17 in turn rotates at the lower end of the rotary shaft 18 by 90 degrees. The holders 17b at either ends of the exchanging arm 17 grasp a used tool holder 7 mounted to the spindle 6 and a standby tool holder 7 mounted to the magazine pot 11, respectively, at the same time. The exchanging arm 17 cannot displace in the vertical direction under this condition even if the first cam plate 21 rotates, since the second roller follower 26 of the swing lever 22 is guided by the cam groove 21a at a concentric arc of a small diameter.

Supposing that the first and second cam plates 21 and 27 continue to rotate, the second roller follower 26 of the swing lever 22 reaches an eccentric part of the guide groove 21a. The exchanging arm 17 is lowered in the vertical direction to pull out the tool holders 7 from the spindle 6 and the magazine pot 11, respectively. The exchanging arm 17 cannot rotate under this condition since the rollers 29 of the roller follower assembly 28 reach a linear part of the cam groove 27a of the second cam plate 27.

Supposing that the first and second cam plates 21 and 27 further continue to rotate, the rollers 29 of the roller follower assembly 28 reach a lead part of the cam groove 27a, causing the exchanging arm 17 to be rotated by 180 degrees. The tool holders 7, 7 at either ends of the exchanging arm 17 are displaced for each other. The second roller follower 26 of the swing lever 22 is then guided by the cam groove 21a of the first cam plate 21, and the exchanging arm 17 is raised in the vertical direction. Through this operation, the exchanging arm 17 inserts the used tool holder 7 into the magazine pot 11 and the standby tool holder 7 into the end of the spindle 6. Then, the second cam plate 27 operates to turn the exchanging arm 17 by 90 degrees so that the exchanging arm 7 departs from the tool holders 7, 7 and returns to the initial standby position. The spindle head 5 is thereafter lowered in the vertical direction so as to start the machining of the workpiece W.

The hydraulic control 40 operates again to reduce the hydraulic pressure in the hydraulic cylinder 39, thereby locating the shift gear 33 to the first position. The engagement is released between the second gear section 33b of the shift gear 33 and the second drive gear 35 while the lock member 41 is withdrawn from the engaging recess 34a of the first drive gear 34. On the other hand, the engagement is established between the first gear section 33a of the shift gear 33 and the first drive gear 34, while the lock member 41 is displaced along with the shift gear 33 and introduced into the engaging recess 35a of the second drive gear 35. The rotation of the drive motor 15 causes torque to be transmitted through the pair of bevel gears 30 and 31 to the drive shaft 32, then to the first gear section 33a of the shift gear 33 and the first drive gear 34, and finally to the gear section 81 of the tool magazine 8. The magazine pot 11 housing another tool holder 7 to be next used is allocated to the exchanging position. The lock member 41 is in engagement with the engaging recess 35a of the second drive gear 35, thereby reliably preventing the second drive gear 35 from rotating.

What is claimed is:

1. An automatic tool exchanging apparatus comprising:

a tool magazine including a plurality of magazine pots for accommodating tools arranged in a circle, said tool magazine being turnable about an axis of the circle so as to position a designated magazine pot in an exchanging position;

an exchanging arm including a support turnable about a first rotation axis and displaceable along the first rotation axis, and a holder extending from said support for grasping a tool at a leading end of the tool, said exchanging arm being configured to turn and displace to carry a tool between the designated magazine pot and a leading end of a spindle of a machine tool configured to spin the tool about a second rotation axis; and a single drive motor configured to commonly drive the exchanging arm for turning and displacement and the tool magazine for turning, a drive member rotated about a rotation axis parallel to the third rotation axis by the drive motor, a shift gear mounted on the drive member for displacing along the drive member between a first position where the shift gear is engaged with the first drive gear and a second position where the shift gear is engaged with the second drive gears, wherein said first rotation axis is parallel to a plane including said circle, said axis of the circle is parallel to a plane orthogonal to said second rotation axis, driving power is transmitted from the drive motor to the tool magazine via a first drive gear configured to rotate about a rotation axis parallel to said axis of the circle, and driving power is transmitted from the drive motor to the exchanging arm via a second drive gear configured to rotate about a rotation axis parallel to said axis of the circle and a cam mechanism receiving a torque from the second drive gear for converting the torque into turning and displacement movements of the exchanging arm.

2. An automatic tool exchanging apparatus comprising:

a tool magazine including a plurality of magazine pots for accommodating tools arranged in a circle, said tool magazine being turnable about an axis of the circle so as to position a designated magazine pot in an exchanging position;

an exchanging arm including a support turnable about a first rotation axis and displaceable along the first rotation axis, and a holder extending from said support for grasping a tool at a leading end of the tool, said exchanging arm being configured to turn and displace to carry a tool between the designated magazine pot and a leading end of a spindle of a machine tool configured to spin a tool about a second rotation axis;

a single drive motor configured to commonly drive the exchanging arm for turning and displacement and the tool magazine for turning;

a first drive gear configured to rotate about a first drive gear rotation axis for transmitting driving power from the drive motor to the tool magazine;

a second drive gear configured to rotate about a second drive gear rotation axis for transmitting driving power from the drive motor to the exchanging arm;

a drive member configured to rotate about a drive member rotation axis by power from the drive motor; and a shift gear mounted on the drive member for displacement along the drive member between a first position where the shift gear is engaged with the first drive gear and a second position where the shift gear is engaged with the second drive gear.

3. The automatic tool exchanging apparatus according to claim 2, wherein said shift gear is provided with a lock member selectively fitted in the second drive gear at the first position so as to prevent the second drive gear from turning and in the first drive gear at the second position so as to prevent the first drive gear from turning.

4. The automatic tool exchanging apparatus according to claim 2, further comprising a cam mechanism for receiving a torque from the second drive gear and converting the torque into turning and displacement movements of the exchanging arm.

5. The automatic tool exchanging apparatus according to claim 2, wherein said cam mechanism includes a first cam plate driven by power from the second drive gear and a swing lever for vertically moving the exchanging arm.

6. The automatic tool exchanging apparatus according to claim 5, wherein said cam mechanism includes a second cam plate driven by power from the second drive gear for rotating the exchanging arm about the first rotation axis.

7. The automatic tool exchanging apparatus according to claim 6, wherein said first and second cam plates have a common drive shaft about which the first and second cam plates rotate.

* * * * *